Dec. 8, 1970  KISABURO OKUMA  3,545,125
APPARATUS FOR PNEUMATICALLY EFFECTING REMOTE
CONTROL OF MOVABLE TOYS
Filed April 16, 1968  3 Sheets-Sheet 2
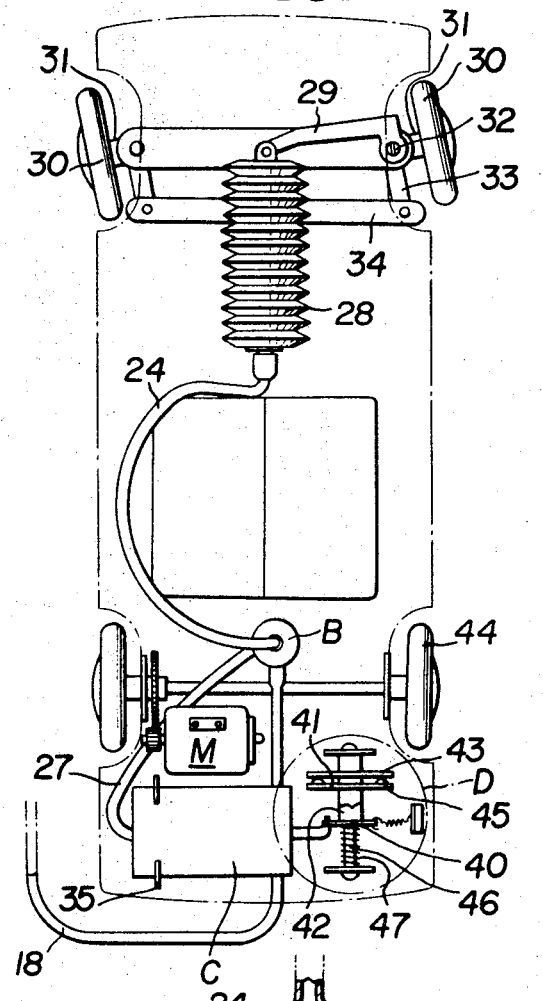
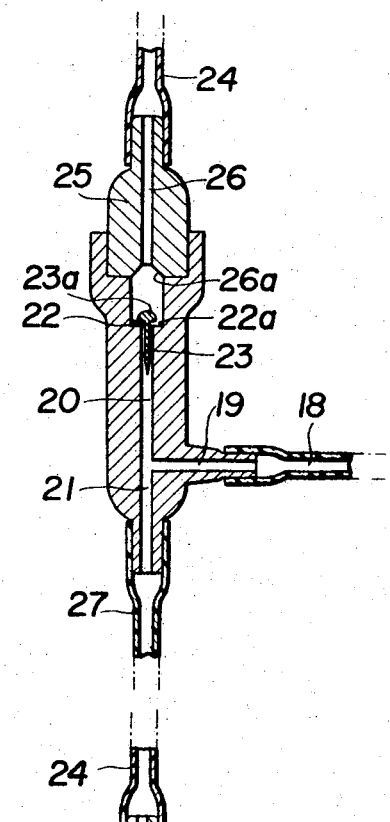
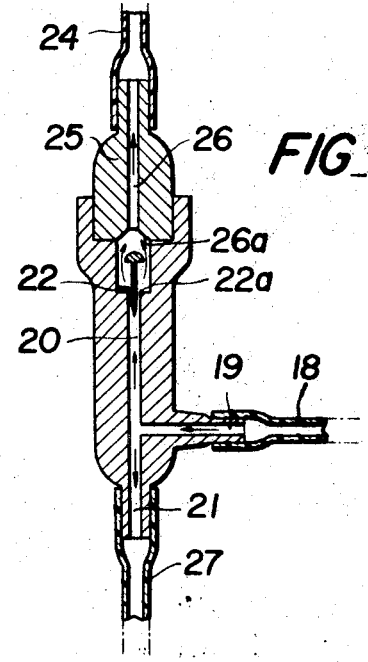
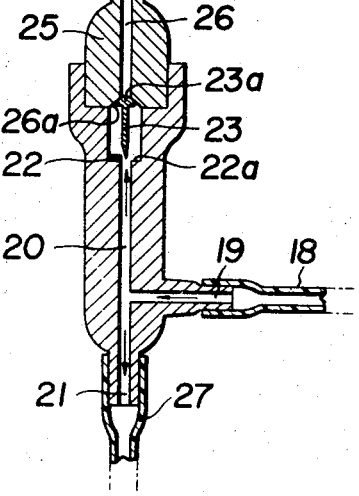
INVENTOR.
Kisaburo Okuma
BY
Kelman and Berman
Agents

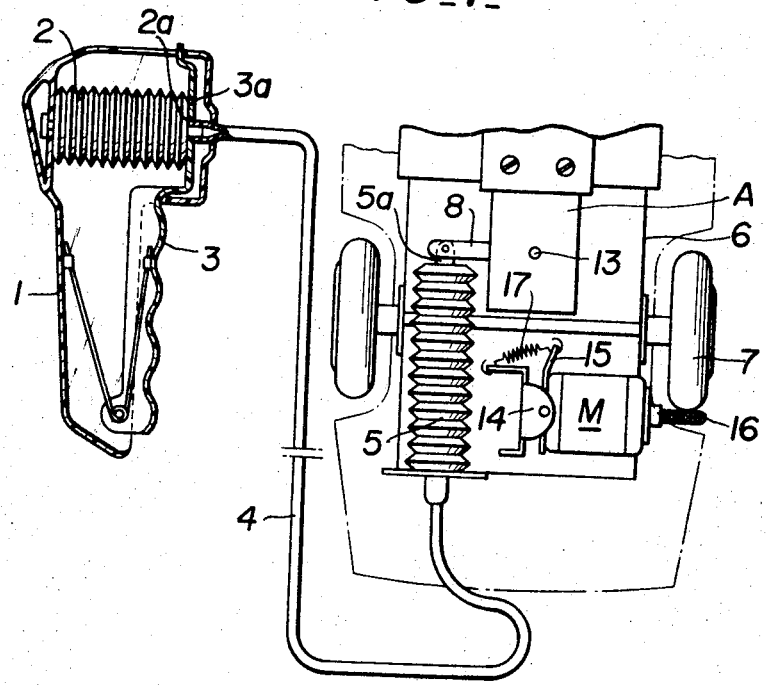
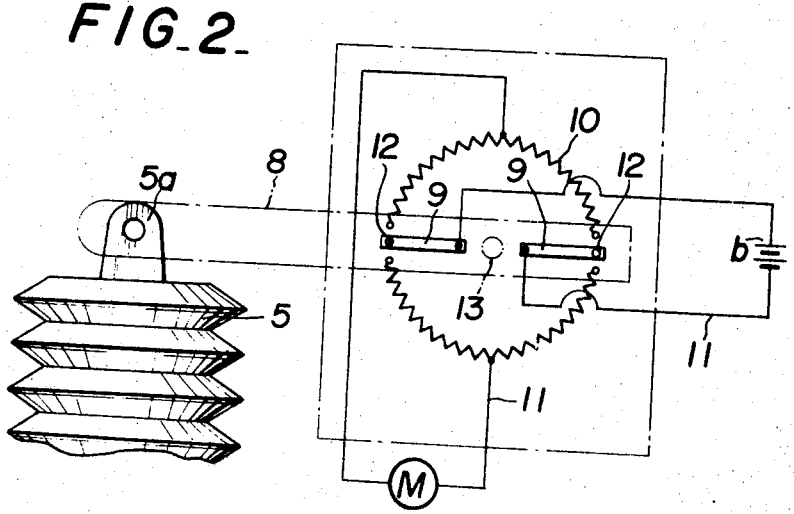

FIG_5a_
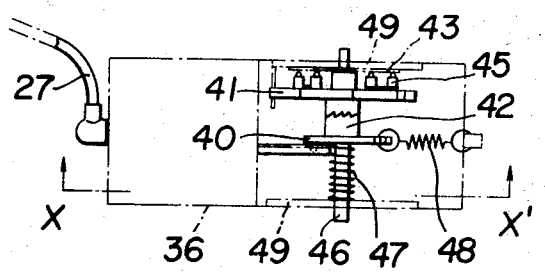
FIG_5b_
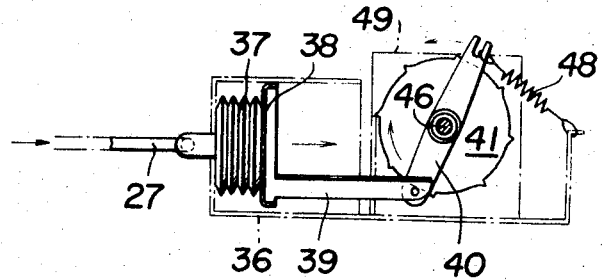
FIG_6_
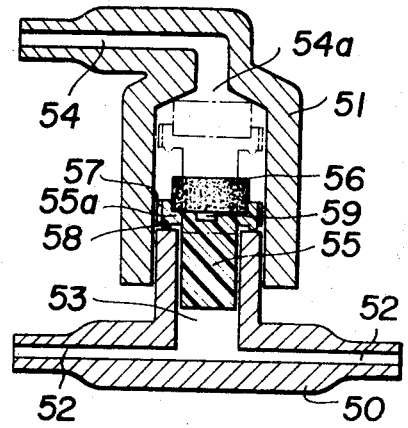

United States Patent Office 3,545,125
Patented Dec. 8, 1970

---

3,545,125
APPARATUS FOR PNEUMATICALLY EFFECTING REMOTE CONTROL OF MOVABLE TOYS
Kisaburo Okuma, Saitama-ken, Japan, assignor to Okumaseisakujo Co., Ltd.
Filed Apr. 16, 1968, Ser. No. 721,853
Claims priority, application Japan, Feb. 15, 1968, 43/9,661
Int. Cl. A63h *30/00*
U.S. Cl. 46—210                                              2 Claims

ABSTRACT OF THE DISCLOSURE

A toy car is equipped with an electric motor driving the rear wheels and steerable front wheels. The motor and the steering gear are controlled by bellows which receive air from a flexible tube through a valve transmitting the air to the steering control at low flow rate and to the motor control at high flow rate. The air is supplied by a remote hand-operated bellows through the flexible tube.

---

The present invention relates to the remote control of movable toys such as toy cars, and particularly to a pneumatically controlled toy.

Movable toys were controlled remotely heretofore by mechanical devices, such as a wire which is pulled or turned, or by electrical devices. The known mechanical remote control devices require substantial skill. The wire used is readily bent or broken in use. Electrical remote controls are costly.

The present invention overcomes the shortcomings of mechanical and electrical remote control apparatus by providing a simple pneumatic control system.

In its more specific aspects, the invention provides the chassis of a movable toy with drive means which propel the chassis and with a drive control mechanism which includes first bellows operatively connected to the drive means for controlling the same in response to the inflation and deflation of the bellows. An actuating mechanism remote from the chassis includes second bellows and manual operating means for expanding and contracting the second bellows. A flexible tube which connects the two bellows transmits air therebetween when the second bellows is expanded and contracted.

The invention may further provide the chassis with a third bellows which controls the steering mechanism of the toy, a valve being operatively interposed on the chassis between the flexible tube and the first and third bellows. The valve responds to the flow rate of the air transmitted by the tube for directing the air to the first and third bellows respectively in response to the magnitude of the air flow which can be manually controlled at the actuating mechanism.

If the toy is a wheeled vehicle, and one of the wheels is motor driven, the drive control mechanism controls operation of the motor, and the steering mechanism shifts the plane of rotation of a second wheel.

Other features and the resulting advantages of this invention will become apparent from the following description of preferred embodiments thereof when taken in conjunction with the accompanying drawings in which:

FIG. 1 is a plan view of a first remote control arrangement of the invention;

FIG. 2 shows a portion of the apparatus of FIG. 1 partly on a larger scale and partly by conventional symbols;

FIG. 3 shows a toy vehicle remotely controlled according to the invention in plan view and without the actuating mechanism of its remote control;

FIGS. 4a, 4b, 4c show a valve of the vehicle of FIG. 3 in enlarged elevational section in three different operating positions;

FIG. 5a shows a portion of the apparatus of FIG. 3 on a larger scale;

FIG. 5b shows the device of FIG. 5a in section on the line X–X'; and

FIG. 6 shows a modified valve in a view corresponding to that of FIG. 4a.

FIG. 1 shows a remote control mechanism for a toy car which is only partly shown. The actuating mechanism of the remote control apparatus has a casing 1 in the shape of a pistol grip. One end of bellows 2 is attached to an inner wall of the casing 1, whereas, the free end 2a carries a presser plate 3a integral with a spring-loaded trigger 3. When the trigger 3 is squeezed, air is driven from the contracting bellows 2 into a long and narrow flexible tube 4, as is described in more detail in my simultaneously filed application Ser. No. 721,779.

The other end of the tube 4 is connected to bellows 5 which is mounted on the chassis 6 of a toy car only partly shown in FIG. 1 and controls a motor M for the propelling rear wheel 7 of the car. A connector 5a at the free end of the bellows 5 is hingedly attached to a lever 8 pivoted on the chassis 6 by a pin 13, as is better seen in FIG. 2. Two conducting strips 9 on the lever 8 on opposite sides of the pin 13 carry contacts 12 which engage respective semi-circular resistors 10 when the lever is angularly displaced from the illustrated neutral position. The leads 11 of the motor M are connected to center taps on the resistors 10. Conductors 11' respectively connect the terminals of a battery *b* to the strips 9.

The base plate 15 of the motor M is pivotally mounted by a bracket 14 on the chassis 6. A spring 17 attached to the bracket 14 and the base plate 15 biases the motor toward a position in which its output shaft 16 frictionally engages the wheel 7.

When the trigger 3 is squeezed, the bellows 5 is inflated, and the resulting angular displacement of the lever 8 causes the motor M to be energized at a speed which increases with the displacement angle of the lever. When the bellows 5 is deflated, the motor is energized to run in the opposite direction. It will be understood that the position of the apparatus is not the same in FIGS. 1 and 2.

A toy car is shown in FIG. 3 without its actuating mechanism, which may be identical with that seen in FIG. 1 and supplies the car with compressed air through a flexible tube 18 at a pressure corresponding to the rate at which the trigger 6 is squeezed. The tube is attached to a valve B seen in more detail in the several views of FIG. 4.

The valve has an inlet 19 connected to the tube 18 and branching into two conduits 20, 21. A valve seat 22 in a valve chamber at the end of the branch conduit 20 remote from the inlet 19 has notches 22a to permit restricted passage of air when the head 23a of a movable valve member 23 engages the seat 22 under the force of gravity, as is seen in FIG. 4a. The valve chamber is upwardly bounded by a tubular plug 25 whose bore 26 connects the chamber to a tube 24.

The orifice 26a of the bore 26 in the valve chamber flares conically to form a seat for the valve head 23a when the valve 23 is held against plug 25 by air pressure, as shown in FIG. 5c. Air then flows from the intake 19 through the branch conduit 21 into another tube 27.

The tube 24 leads to bellows 28 mounted on the front of the car for operating a connecting rod 29 attached on one of the two knuckle pivots 32 which carry the front wheels 30 on spindles 31. The two knuckle pivots also carry knuckle arms 33 hingedly connected by a tie rod 34, as is conventional in automotive steering linkages.

The tube 27 leads to the controls C, D for a drive motor M connected to one of the rear wheels 44 by a gear transmission 60, the controls being mounted on the chassis of the car by a bracket 35 and better seen in FIGS. 5a and 5b. A housing 36 encloses bellows 37 which is connected to the tube 27. An end plate 38 on the bellows carries a bar 39 which extends outward from the housing 36 and is hingedly attached to a lever 40 rotatable on a shaft 46. The shaft is journaled in a bracket 49 on the chassis, and a helical compression spring 47 is coiled about the shaft 46 between the bracket 49 and the lever 40. A tension spring 48 tends to turn the lever clockwise from the position shown in FIG. 5b, and thereby to deflate the bellows 37.

A saw-toothed clutch 42 on the lever 40 is normally held engaged by the spring 47 to connect the lever to a disc 41 journaled in the bracket 49 which carries the movable contacts 45 of a control switch in the energizing circuit of the motor M, not otherwise shown. The fixed contacts, not themselves illustrated, are arranged on a disc 43 coaxial with the disc 41.

The apparatus shown in FIGS. 3 to 5 is operated as follows:

As long as air is supplied by the non-illustrated actuating mechanism at a low rate, the valve 23 assumes the position shown in FIG. 4a, and air flows from the inlet 19 mainly through the notches 22a in the valve seat 22 to the bellows 28 which controls the steering mechanism. The pressure is insufficient to expand the bellows 37 against the restraint of the spring 48.

When air is supplied at a high flow rate, pressure builds up under the valve head 23a, and the valve 23 is lifted by the air stream, as seen in FIG. 4b until it closes the orifice 26a of the bore 26 in the position shown in FIG. 4c. The entire air pressure is then applied to the bellows 37 to expand the same and thereby to pivot the lever 40 and to turn the disc 41. When the air pressure is released, the lever 40 is returned to its original position by the spring 48. The disc 41 is held stationary by frictional engagement of the switch contacts, and the clutch 42 slips. The disc 41 is thus indexed by each quick burst of air from the actuating mechanism to perform a sequence of motor controlling operations conventional in themselves, such as to alternatingly stop and start the motor M.

The modified valve shown in FIG. 6 has a body consisting of two parts 50, 51 which are connected by non-illustrated threads to define a valve chamber therebetween. The two open ends of a passage 52 in the body portion 50 provides an inlet and a connection to the tube 27 in a manner obvious from FIG. 4, but not illustrated again in FIG. 6. A branch tube 53 connects the passage 52 with the valve chamber and vertically guides a valve member 55 whose enlarged head 55a carries a foam rubber disc 56 and has vertical grooves 57 in its circumference. Spacers 58 projecting from the underside of the head 55a provide a restricted duct for the flow of air from the passage 52 through the grooves 57 into the valve chamber which communicates with the non-illustrated tube 24 through a conduit 54 in the body part 51.

The orifice 54a of the conduit 54 in the valve chamber flares conically for sealing engagement with the rubber disc 56 when the valve member 55 is lifted by air pressure as described above with reference to FIG. 4b. A recess 59 in the top surface of the valve member 55 under the disc 59 relieves the latter of some pressure.

With either the valve of FIG. 4 or that of FIG. 6, the same actuating mechanism permits both the motor drive and the steering mechanism to be controlled in a simple manner. The apparatus can be built at low cost and the flexible tube which connects the actuating mechanism with the remotely controlled toy is not readily damaged.

What I claim is:
1. A remotely controlled movable toy comprising, in combination:
(a) a chassis;
(b) drive means on said chassis for propelling the same;
(c) drive control means on said chassis including first inflatable and deflatable bellows means operatively connected to said drive means for controlling the same in response to the inflation and deflation of said bellows means;
(d) actuating means remote from said chassis including second bellows means and manual operating means for expanding and contracting said second bellow means;
(e) a flexible tube connecting said first bellows means and said second bellows means for transmitting air therebetween when said second bellows means is expanded and contracted by said operating means; and
(f) steering means for steering said chassis and steering control means on said chassis, said steering control means including
(1) third inflatable and deflatable bellows means operatively connected to said steering means for controlling the same in response to the inflation and deflation of said third bellows means, and
(2) valve means operatively interposed on said chassis between said tube and said first and third bellows means, said valve means responding to the rate of flow of the air transmitted by said tube for directing said air from said tube to said first bellows means at a first flow rate of said air, and to transmit said air at a second flow rate thereof to said third bellows means, said first and second flow rates being different.

2. A toy as set forth in claim 1, wherein said drive means include a motor and a first wheel driven by said motor, said drive control means controlling operation of said motor, and said steering means include a second wheel rotatable in a plane, said steering control means being operable for angularly shifting said plane.

References Cited
UNITED STATES PATENTS

| | | | |
|---|---|---|---|
| 2,638,712 | 5/1953 | Jackson | 46—210X |
| 2,688,821 | 9/1954 | Bunting | 46—210X |
| 2,940,217 | 6/1960 | Hauge | 46—210X |

LOUIS G. MANCENE, Primary Examiner

R. F. CUTTING, Assistant Examiner